(12) United States Patent
Pamfiloff

(10) Patent No.: US 9,302,792 B1
(45) Date of Patent: Apr. 5, 2016

(54) PROCESS FOR THE PRODUCTION OF ELECTRIC ENERGY FOR SPACECRAFT UTILIZING THE COLLECTION OF CHARGED PARTICLES IN SPACE

(71) Applicant: Eugene B. Pamfiloff, San Anselmo, CA (US)

(72) Inventor: Eugene B. Pamfiloff, San Anselmo, CA (US)

( * ) Notice: Subject to any disclaimer, the term of this patent is extended or adjusted under 35 U.S.C. 154(b) by 344 days.

(21) Appl. No.: 13/999,916

(22) Filed: Mar. 31, 2014

(51) Int. Cl.
*B64G 1/42* (2006.01)
*G21H 1/02* (2006.01)

(52) U.S. Cl.
CPC . *B64G 1/421* (2013.01); *G21H 1/02* (2013.01)

(58) Field of Classification Search
None
See application file for complete search history.

(56) References Cited

U.S. PATENT DOCUMENTS

2011/0140729 A1* 6/2011 Nakamura et al. ....... 324/762.01

OTHER PUBLICATIONS hqew.net Voltage Doubler,Voltage Tripler,Voltage Quadrupler circuit, Oct. 14, 2012.*

* cited by examiner

*Primary Examiner* — Nicole Ippolito
*Assistant Examiner* — Sean Luck

(74) *Attorney, Agent, or Firm* — Steven A. Nielsen

(57) ABSTRACT

The process of the present application facilitates the production of electric energy for spacecraft by the seizure of beta-minus particles and electrons present in the medium of space above and beyond the planet's atmosphere. The features of the subject process make each spacecraft independent from domestic energy sources as are typically required by other electrical systems. In terms of energy production, the subject process will outperform all of the traditional systems applied to spacecraft including photovoltaic setups, fuel cells, batteries and nuclear systems. Photovoltaic panels situated in space are quickly degraded by bombarding cosmic ray particles and solar wind emissions. Since fuel cells require very high operating temperatures, it exposes the craft, its instrumentation and occupants to constant danger. By utilizing the process of the present application, it is no longer necessary for spacecraft to carry large quantities of chemicals for batteries, fuels and oxidizers for fuel cell generators, hazardous nuclear generators or large bulky photovoltaic panels subject to frequent malfunction. It is an innovative process for the production of electric energy by the attraction and seizure of beta-minus particles and electrons emitted from the Sun's corona as part of the solar wind that permeates the heliosphere. Because it captures free electrons directly, it does not consume power to convert one form of energy into another. It functions continuously throughout and beyond the heliosphere. It can be scaled to accommodate the electric power requirements of all spacecraft, including satellites and space stations. The process will accommodate the electric needs of base stations and surface vehicles situated on various moons and asteroids throughout the solar system including the planets Mercury and Mars. Some of the terms that describe the advantages of the process of the present application are simplicity, efficiency, adaptability, versatility, low energy consumption, and high productivity. Consequently, a reliable, enduring and safe electric power source for space craft has not been available until the development of the process of the present application.

6 Claims, 8 Drawing Sheets

PROCESS FOR THE PRODUCTION OF ELECTRIC ENERGY FOR SPACECRAFT UTILIZING THE COLLECTION OF CHARGED PARTICLES IN SPACE

BACKGROUND

This application relates to the field of atomic physics and atomic engineering, particularly to the attraction and seizure of beta-minus particles and electrons emitted from the Sun's corona for the production of electric energy for spacecraft through an efficient and effective process.

PRIOR ART

Currently a number of methods are available to produce electric energy for spacecraft; among these are photovoltaic panels, chemical batteries and fuel cells or similar devices. All of these involve the conversion of one form of energy into another. Typically batteries can take many forms such as chemical, nuclear, or thermal to either produce or store DC voltage. The conversion of chemical reactions into electrical energy is a common application that has limitations in the amount of energy made available. And because many battery variations must be charged beforehand, additional limitations are placed on the electrical systems of the craft. While photovoltaic systems convert sunlight into electricity through photon excitation of orbiting electrons of silicon atoms of the solar panel. Fuel cells require a fuel such as hydrogen to burn in oxygen to liberate some electrons. As can be seen, the available electric energy is limited by the quantity of hydrogen and oxygen that the craft can carry. Each of these systems has many limitations and disadvantages that cannot be eliminated. The Apollo flights of the late 1960's and early 1970's have utilized hydrogen fuel cells to supply the required electrical energy to the space crafts. At the time, the dangers associated with fuel cells were not apparent until shortly after the launch of Apollo 13. Then two of the three hydrogen fuel cell generators exploded while it was underway to the moon. Because fuel cells require very high operating temperatures in the range of 800° to 1200° Celsius, it exposes the craft and its occupants to constant danger. Today the disadvantages of each of these systems are well known. For example, the energy produced by batteries is limited to the quantity of atoms and molecules available for the chemical interactions. Photovoltaic panels situated in space are quickly degraded by bombarding cosmic ray particles and solar wind emissions. An alternative with applications limited to unmanned craft is a nuclear powered system designated as a radioisotope thermoelectric generator (RTG). It has been used on the Voyager I and Voyager II space craft, both launched in 1977. However, the dangers associated with nuclear electric power plants were ignored, as they were and remain far too dangerous to launch from the planet's surface due to the catastrophe that would have resulted from a launch failure. Consequently, a reliable, enduring and safe electric power source for space craft has not been available until the development of the process of the present application.

Although significant advances have occurred with many of these conventional power sources described above, each of those methods has a number of other disadvantages.

Additional Disadvantages of Prior Art

1. To achieve the maximum efficiency, photovoltaic panels must face the Sun, where this obligates orbiting craft to the constant motorized adjustment of the panels, leading to wear and tear of the mechanism and the consumption of additional energy.
2. If the sunlight is shielded from a fraction of the panel, electric production drops to a fraction of that previously produced, as commonly occurs with orbiting satellites and space stations.
3. If sunlight is blocked by the planet being orbited, then electric production will stop for the duration until the craft moves again into the light.
4. The photovoltaic panels are also exposed to the constant bombardment by the particles of the solar wind and cosmic radiation that quickly erodes and degrades the panels forcing their frequent replacement, where in space this is not a simple task.
5. Since batteries have limited energy storage capacity, continuous high energy demands are not possible and thereby their usefulness to spacecraft is minimized.
6. Fuel cell generators have a very short duration of energy production due to the limited amount of fuel and oxidizer that the craft can carry.
7. Nuclear generators are not suitable for manned craft or portions thereof that would be returned to earth.
8. Each of the aforementioned systems complicates the production of electric energy as they convert one form of energy into another.

ADVANTAGES AND SUMMARY

However, the process of the present application overcomes each of the described disadvantages. Furthermore, the subject process does not convert one form of energy into another, as do the other methods described above. Here, the subject process actually produces electric energy directly by the seizure of charged particles contained in the medium permeated by solar wind.

The present application describes an advantageous electrical system that provides electric power generation without the expenditure of fossil, chemical or nuclear fuels. It functions without the emission of hazardous materials or substances. Furthermore, it does not contain parts that would experience undue wear or parts that would deteriorate over short periods of use. It reliably, efficiently and economically produces electric energy continuously for the term of the voyage or mission, and where there was any production in excess of immediate needs, it could be stored for future use. And since the power generation is fueled by something other than those constantly diminishing onboard supplies needed to generate electricity, these features make it the most practical of systems for all manned or unmanned spacecraft in orbit or those underway throughout and beyond the solar system. The technology derived from the present application makes practical such independent power generation systems for use in large and small scale applications for satellites and manned craft and for short and long term voyages.

The process can be scaled to accommodate the energy requirements of most implementations, whether small communications satellites, manned space stations, or spacecraft of every type. For the production of electric energy on a large scale, the present application represents the first pragmatic technology to emerge for this purpose that takes advantage of the plasma consisting primarily of protons and electrons incessantly emitted from a star. The process allows spacecraft to be independent of the domestic fuels typically required by other systems.

The process is driven by the seizure of certain charged particles comprising the solar wind. And once the system is fully energized, it requires only an infrequent enhancement to sustain operation. The process is further explained below.

As previously indicated, the electric generating capabilities of the process of the present application can be used as independent power generation units for every type of spacecraft, irrespective of the direction or duration of the planned mission. Furthermore, the electric generation of the process is ideal to power roving vehicles or fixed installations, facilities or bases located on asteroids, planets or moons with little or no atmosphere such as our moon, several of the moons of Jupiter or Saturn, or the planets Pluto, Mercury and Mars.

Description of the Process

The process of the present application differs substantially from the prior art, as it facilitates the production of electric energy by the targeting and seizure of beta-minus particles and electrons, representing two of the many emitted from the array of particles that comprise solar wind radiation. Solar wind provides a continuous stream of charged particles that are ingredients of the plasma emitted from the Sun's corona. This is common to all active stars. The charged particles consist primarily of protons, conventional electrons and beta-minus particles. The solar wind permeates the area to form a discernible boundary at the edge of the space surrounding the solar system called the heliosphere, which is situated at a point where the pressures are equal with that of the interstellar medium. That boundary is located far beyond the rock called Pluto.

The portion of space known as the heliosphere is also pervaded with other material consisting of particles larger than the subatomic discussed above. They include comets, asteroids, rocks, smaller clumps of matter, chunks of atoms, molecules and individual atoms of various elements. Many of the clumps and chunks are formed of heavier atoms such as iron and nickel. All of this material being attracted by large gravitational bodies causes some to advance towards the moons, planets and the star that anchors the center of the system. Consequently, impacts and collisions with the large bodies are commonplace, most particularly with the Sun. These atoms entering the star provide a continuous source of new subatomic particles, becoming a portion of the solar wind.

Since the subject process involves the attraction and seizure of beta-minus particles and electrons being constituents of solar wind, a discussion of those particles is presented. Particles that make up the solar wind are continuously emitted in all directions from the surface of active stars. The majority of the radiation in terms of particles with mass consists of positively charged protons, with beta-minus and electrons representing negatively charged particles. Some of the protons are the nuclei of hydrogen or artifacts of heavier atoms, while others are the products of neutron decay. A small part of the radiation consists of heavier intact nuclei, less their electrons, such as ions of $^2$H, $^3$He, $^4$He, and occasionally even heavier nuclei. Also present in the radiation are beta-plus particles (positrons), neutrinos, including x-ray, gamma ray and other photons. Because there are in fact two different sources of electrons that comprise solar radiation, they are identified as indicated below.

Even though beta-minus particles have properties identical to that of electrons, they have a different source than the conventional electrons present in the stream of solar radiation. Conventional electrons are those that orbit the nucleus of every atom, their number being equal to the number of protons that identify the atom. Upon entry into the star, these electrons are knocked away from the atom by repulsion of like-charges, collisions with other particles and the absorption of thermal energy. However, the beta-minus particles are products of neutron decay, which do not require an external stimulus. Just as the high temperatures or thermal energy influence orbiting electrons to breakaway, so are compound nuclei that contain a mix of protons and neutrons encouraged to disassemble. Nearly all such nuclei are broken down into free protons and neutrons. However, once freed, the neutrons demonstrate instability and each decays by the emission of a beta-minus particle while producing a proton. For example, when a single iron atom falls into a star, the isotope $^{56}$Fe consisting of 26 protons, 30 neutrons and 26 conventional electrons begins to decompose. First the 26 orbiting electrons are liberated, and then the nucleus breaks apart into individual protons and neutrons. But, the unstable neutrons decay further by the emission of beta-minus particles, providing 30 additional protons for a total of 56 and the 30 beta-minus particles bring the total of electrons to 56. During a free neutron decay mode, other particles are simultaneously emitted from each, including an antineutrino, gamma ray photon and additional mass is discharged. Furthermore, the hydrogen and helium atoms that initially formed the star contained equal numbers of electrons and protons. And every neutron that was present added an extra electron and proton to the plasma. As can be seen, electron emissions as part of solar wind radiation must be equal to or slightly exceed the number of protons. Hence, at any point of the spherical space that encompasses the volume of the heliosphere, negative charges are approximately equal to the presence of positive charges. These electrons and protons make up the primary particles of solar wind radiation.

One of the purposes of the process of the present application is for the seizure and utilization of the available electrons at any point in space as electric energy for the benefit of spacecraft. This system that takes advantage of these abundant solar electrons is further described herein. It is known that exposing the plates of a parallel plate capacitor to an electric potential difference will establish a charge upon them equal to the potential. This involves the removal of electrons from the neutral atoms of one plate with the transfer and placement of those electrons onto the opposite plate. Consequently, one plate becomes positively charged due to the shortage of electrons and the other plate becomes negatively charged due to the surplus electrons. Furthermore, when a parallel plate capacitor is charged as previously described and subsequently isolated, it can retain its effective electric charges for extended periods of many days, months or even years without substantial degradation. It follows that the positive and negative electric fields produced by such a capacitor will likewise persist for extended periods or until the capacitor is purposely discharged.

This is one of the principles by which the process of the present application functions. The process involves a charge segregation and storage assembly by which the negative and positive charges of atoms and molecules of the material can be separated, stored and if necessary, isolated. This entails the removal of electrons from one component with the placement of those electrons on another component. Furthermore, capacitors of various types are adaptable to the process. It is also understood that a system described in the present application may contain many charge segregation and storage assemblies or as many as may be required by an embodiment or utilization.

Since the beta-minus particles and electrons of the solar wind radiation are already free particles, it is not necessary to expend energy to stimulate or excite the particles, as would be necessary with conventional orbiting electrons held in place as a result of electron binding energy. It is an energy efficient process for the seizure and control of free electrons for the production of electricity and other purposes to which the process may be applied. These results are accomplished while the craft moves through the medium containing solar radiation, where it attracts and retains the beta-minus particles and electrons from the emitted plasma by electrically charged components upon contact and through associated electric fields.

The process is superior to any other intended for the utilization of beta-minus particles and electrons contained in solar emissions. It simplifies every application, implementation or utilization, because as the free electrons are seized from the medium they provide a continuous supply of electric energy. Additionally, it is extremely efficient, in that once the system is fully charged thereafter it requires only an occasional replenishment of energy to sustain operation. These are important features for any utilization intended for the production of electric energy.

Regardless of the crafts' location within the heliosphere, the solar wind radiation is always moving towards it. By placing a positively charged receiver terminal or similar component exposed to the medium, nearby electrons and beta-minus particles will be attracted to it and seized upon contact. The seized electrons are subsequently sequestered by other components and made available as electricity for distribution to various electric devices throughout the craft.

The embodiments contain conductive components, which include but are not limited to attraction and interception components and electron sequestration components. Shown in FIG. 1A is part 4 identified as the positive field plate representing one of the components responsible for the attraction and interception of electrons from the external solar wind radiation source. Here also shown is part 12 identified as the electron isolation terminal to which a positive charge has been conveyed through induction by component part 10. In addition to the isolation of the captured electrons, as described in subsequent figures, part 12 also contributes to their attraction and seizure from the medium and transfer from part 4. An embodiment may contain any quantity of each of these components, although the actual number of each is determined by the requirements of the utilization.

On occasion, the beta-minus particles and electrons that are subject to capture will be referred to collectively as the object or target particles. Furthermore, the charged components dedicated to the capture of the electrons will also be referred to as the electron interception terminal or receiver plate. The components may be constructed of various conductive materials and in various geometrical configurations, sizes, shapes, arrangements, and quantities.

The charged electron interception terminal can be configured into many forms, where some could take the form of a grid, pane, panel, or plate. Throughout this application the term "grid" will be used to represent a variety of attraction and apprehension components as may comprise certain embodiments that include but are not limited to the use of screens, lattices, nets, webs, gridirons, gratings, trellises, grills, grids or similar components, or any combination thereof. And the term "pane" will be used to represent a variety of attraction and apprehension components as may comprise certain additional embodiments that include but are not limited to the use of sectioned or perforated panels, sheets, foil, disks, bars, rods, shafts, tubes, cones, plates, panes or similar components, or any combination thereof. And the term "panel" will be used to represent a variety of attraction and apprehension components as may comprise certain additional embodiments that include but are not limited to the use of an assembly of non-perforated, sheets, foil, disks, bars, rods, shafts, tubes, cones, plates, panes, or similar components or any combination thereof. Furthermore, an embodiment may contain any combination of grids, panes, panels or other varieties of components such as plates. The grid, pane, panel and plate type components are defined in greater detail below.

The primary difference between the electron interception component types relates to the method of their utilization and the energy requirement of the facility or craft. The grid type consists of a conductive material containing mesh openings through which the target particles can enter or pass along the surface. Whereas the pane type consists of a sheet or sheets of solid conductive material containing perforations of various configurations through which the particles can enter or pass along the surface. And the panel type consists of an assembly of multiple individual non-perforated conductive sheets arranged with gaps in between where along the surface of which the particles can pass. The plate type consists of one or more charged plates arrange to intercept the target particles. The primary objective is to expose the charged surfaces of the various types to the target particles and as may be required, to enhance the probability of contact. Some interception types as may be used within certain embodiments may be interchangeable and take a multitude of forms that are not specifically described herein, subject to the requirements of the implementation.

As previously stated, the interception components as well as other components may take many forms and can be manufactured from different conductive materials or in some applications, from semiconductors, nanoparticles or ceramic compositions and various assemblages thereof. Certain metals and oxides thereof and various alloys and compounds thereof can also be used in some utilizations. The actual materials, geometrical configurations, sizes, shapes, arrangements, values and quantities of all components of a system are determined by the specific utilization.

Furthermore, various types of the electron interception and other components may be shaped to conform to the shape of adjoining components or the surrounding container or environment into which they are placed. Multiple interceptors, if utilized, are operated individually, as a group or as many groups as are necessary. However, when single or multiple interception components are part of an assembly containing a positive field plate or as applicable, include a negative field plate, they will be referred to collectively as the electron interception assembly (EIA) of a type subject to the embodiment or of each specific implementation.

A positive electric charge is placed upon one component of the electron attraction and interception assembly and to any components attached thereto, in reference to the positive field plate 4. Specifically, through the precise control of the electric potential difference, a charge is conveyed to a percentage of the atoms of the conductive material by the removal of their valance electrons. For example, if 50 percent of the atoms are encouraged to give up one electron to another component, the resultant positive charges will distribute evenly throughout the surface of the material. It is not that the positively charged protons distribute, but that the remaining valance electrons will distribute across the surface of the material leaving positively charged holes evenly distributed. However, a +1 or greater net charge per atom can also be placed on the material, indicating the removal of one or more valence electrons from each atom of the positive field plate 4. The material from which the positive field plate is constructed determines the number of available valance electrons each atom has; as an example, aluminum has three per atom. By the influence of a sufficient electric potential difference applied during the initial system charging phase, all valance electrons could be transferred from plate 4 to plate 6. If the component were made of aluminum, this interaction would leave three positive holes situated with each atom or a +3 charge per atom throughout the material. When necessary, the process provides other methods to reproduce these or similar results.

The now positively charged atoms will extend the positive charge to connected components such as an externally placed electron interception terminal, which is exposed to the medium permeated by beta-minus and conventional electrons. Thus, electrons will be continuously attracted to the terminal and apprehended from the medium upon contact thereto. FIG. 1A shows that the positive field plate 4 can be exposed directly to the medium as the primary interception terminal; however, a variety of attachments to part 4 can also be utilized as the component exposed to the medium to apprehend the electrons. One variation of this configuration is shown in FIG. 7A. Furthermore, the surface of the electron interception terminal or connected components could contain certain textures or attachments that increase its surface area such as an array of adequately spaced individual panels, or as previously stated.

Summarizing the previous discussion, because the number of valance electrons is known and varies with different materials, within certain limits the net average charge per atom of the positive field plate 4 can be controlled. And since the positive field plate, by its location, can be utilized as the primary electron interception terminal, an unprecedented array of energy becomes available to the craft. The amount of energy collected from the medium can be controlled through computer monitoring or even by adjustment of the surface area of the electron interception terminal. As stated above, with some embodiments another component can become the primary electron interception terminal, as detailed later.

Although the principal component shown in FIG. 1A and discussed herein is a single charge segregation and storage assembly comprising components 4 and 6, it should be noted that multilayered or multiple units may be used in various implementations. Similarly, the charge isolation assembly comprising components 10 and 12 could also consist of multilayered or multiple units that may be used in various implementations.

Moreover, by the strict control of the variables described herein, including the average net positive charge per atom placed upon the positive field plate 4 and the induction plate 10, a continuous stream of electrons can be captured from the medium. This has far reaching consequences, as subsequently described.

The required net positive charge is applied to the attraction component, the positive field plate, by the electric potential difference of the power source 2. Through the power source, during the initial system charging phase, electrons are removed from the positive field plate 4 and transferred to the negative field plate 6. As shown in FIG. 2A, the electrons can be prevented from escaping the negative field plate through a function of the power source 2 or by adding a valve 20. And since the negative field plate is now fully charged to specifications and isolated from the positive field plate and the environment, the resultant electric fields will persist for an extended period of time, requiring thereafter only infrequent replenishment of energy. Once the required quantity of electrons has been transferred to the negative field plate the power source can be shut down.

The principle by which the various charged systems function is directly correlated to a series of electric fields specifically imposed upon the principal components. In reference to FIG. 1A and several subsequent figures, the first is the positive electric field placed upon field plate 4. The second is the negative electric field placed upon field plate 6. The third is the positive field placed upon the induction plate 10. The fourth is a negative field induced by plate 10 upon the facing front side of isolation plate 12. The fifth is the positive field induced upon the backside of isolation plate 12. The subject process relies upon the energy stored within the five electric fields described above. However, certain embodiments or utilizations may require additional principal components onto which electric fields must be imposed or induced. And other embodiments may require fewer electric fields than those stated above. However the minor electric fields known to exist with all electric parts and conductors in the presences of an electric current or changing magnetic field are not the subject of this paragraph.

Through connection to field plate 4, a positive charge can be conveyed to an attached accessory such as the receiver plate 18, in the event that it becomes a component of a specific embodiment. This condition is shown in FIGS. 7A and 8A. When placing a positively charged terminal on or near the surface of the craft, nearby solar electrons will be attracted to it and seized upon contact. As the electrons move up the conductor from terminal 18 and approach the positive field plate 4, they are prevented from returning to the medium by a valve 28. Also, the now captured electrons are simultaneously attracted by the electron isolation plate 12.

Previously, during the initial system charging phase, as the electrons transferred from the atoms of positive field plate 4 to the negative field plate 6, strong electric fields were established upon each plate. When charging was complete, the power source shut off or went on standby. Through the electric fields, each plate maintains a constant influence on its counterpart. Assuming that not all valance electrons were initially removed, the negative field plate 6 continues to repel many of the remaining valance electrons still held by the atoms of the positive field plate 4. These repelled valance electrons have no place to go except to the electron isolation plate 12 by attraction to the positive holes established there. The path to the isolation plate 12 is clearly the path of least resistance, as compared to any other route or location, including the medium. Through an induced positive electric charge placed upon the component 12, those repelled valance electrons are attracted and isolated and their return to the field plate 4 is prevented by the valve 22, as shown in FIG. 2A. The quantity of remaining valance electrons and those actually transferring from the positive field plate 4 to the isolation component 12 is subject to the strength of the electric field initially established upon the negative field plate 6 and the ionization potential of those remaining valance electrons. As previously indicated, since electric charges will accumulate upon the facing surface of each plate, it is useful to remove sufficient electrons from the positive field plate and any attachment thereto in reference to receiver plate 18 or other components, so as to establish a positive charge to both the field plate and attachments.

The following discussion is in reference to an attachment to the positive field plate 4. One type of attachment is shown in FIG. 7A as the electron receiver plate 18. The previously captured electrons from the medium were simultaneously attracted by the attached positive receiver plate 18, the positive field plate 4 and the positive charge of the isolation plate 12. As the captured electrons advance towards the positive field plate 4, they are concurrently attracted by the positive holes in the isolation plate 12. Since the captured electrons are now treated as the previously repelled valance electrons, they must follow the same course and accumulate upon the isolation plate 12, where they become immediately available as electricity.

FIGS. 1A through 8A show that the isolation plate 12 also connects to the negative terminal 32 to which the electrical system of the craft is connected. FIGS. 4A through 8A demonstrate the feasibility of utilizing a positive ground terminal 34 with certain embodiments. It should be noted that there are other locations to which the positive ground could be connected. Also, the system could function if the terminals were arranged differently, subject to the implementation. Part of this electrical system could include electric storage devices such as batteries, an inverter or many other devices, subject to the implementation. It should be understood that in addition to batteries, there are many types of electric storage devices available. In an alternate embodiment an inverter could follow the electric storage device in a circuit or vice versa.

The electron isolation assembly consists primarily of two or more types of components that include the following: The positive induction plate 10 carries a positive electric charge. This charge was placed there during the initial system charging phase through the power source 2, a secondary circuit, or through another power source. That while electrons were being transferred from the positive field plate 4 to the negative field plate 6 they were simultaneously removed and transferred from the atoms of the positive induction plate 10. FIG. 6A shows an alternative arrangement to place a positive charge on plate 10. Just as with the charge placed upon the positive field plate 4, the charge placed upon the positive induction plate 10 is also controlled by the net average charge per atom. This means that the strength of all three electric fields that pertain to the electron isolation assembly can be controlled over a wide range. Once the charge is established on the positive induction plate 10, it influences certain interactions within the isolation plate 12. Due to the proximity of one plate to the other, the positive induction plate attracts electrons to the surface of the isolation plate 12 in equal numbers to those removed from plate 10. Because the valance electrons of the atoms within the isolation plate have accumulated on the front surface section, this action induces a strong positive electric charge on the back section or backside of the plate, leaving a positive hole for every displaced electron. It is that induced positive charge on the back section of the isolation plate which contributes to the attraction and draws seized electrons to it. They are attracted to plate 12 and subsequently isolated by the valve 22. In simpler terms, the positive charge placed on induction plate 10 attracts electrons to the surface of the facing isolation plate 12, which in turn induces a positive charge on the backside of plate 12. Since the positive induction plate 10 is charged and thereafter isolated, it maintains its charge for an indefinite period, requiring only infrequent replenishment. However, in some embodiments, the induction plate 10 may not require isolation.

When a component requires replenishment of its electric charge, it is done as previously described or through secondary circuits, not shown as part of the primary circuits contained in the FIGS. 1A through 8A, or as further described herein.

The effect of the induced charge on one component by the electric field of another component, as described above, can be reproduced by other methods that include but are not limited to other types of components and energy applications that include AC current, electromagnets, or other electromagnetic devices and principles or a combination thereof. Likewise, in another embodiment a combination of electric and magnetic fields can be applied for this purpose.

Therefore, once the principal components are properly charged, as during the initial system charging phase and with the negative field plate 6 and the positive induction plate 10 properly isolated, thereafter they will require only infrequent replenishment to maintain the effectiveness of the system operation. The electric energy that accumulates on the isolation plate 12 or multiple plates thereof is thus available as electricity, to be used as initially available, stored or changed to the required form and then utilized as needed.

To satisfy increased electrical energy requirements for the craft, it is accomplished by simply increasing the number of charge isolation component units 10 and 12 beforehand, loading additional units into the system while underway or switching on additional units that are already installed. Furthermore, as previously stated, increasing the surface area of the electron interception terminal or receiver plate 18 will also enhance electric production.

As can be seen, the present process is innovative in the attraction, seizure and isolation of solar electrons available throughout and beyond the space comprising the heliosphere for the production of electric energy for spacecraft, vehicles or bases situated elsewhere in the solar system, thus demonstrating its superiority to every prior art.

DRAWINGS

Figures

Described below are representations of several basic embodiments for which the designations are not indicative of any specific order or preference over any other embodiment. In the drawings, closely related figures have the same alphabetic suffix but different numbers.

FIG. 1A shows one variation of an embodiment in a simplified form containing a positive field plate 4 as the primary electron interception terminal, wherewith electrons are seized and directed to the electron isolation assembly.

FIG. 2A shows another variation of the embodiment containing two valves. Here valve 20 isolates the negative field plate 6 and valve 22 prevents the return of electrons to field plate 4.

FIG. 3A shows another variation of an embodiment containing field plate 4 as the primary electron interception terminal, wherewith electrons are seized, guided through one valve 22 and directed to the electron isolation assembly. A third valve 24 that isolates the induction plate 10 has been added.

Figure 1A:
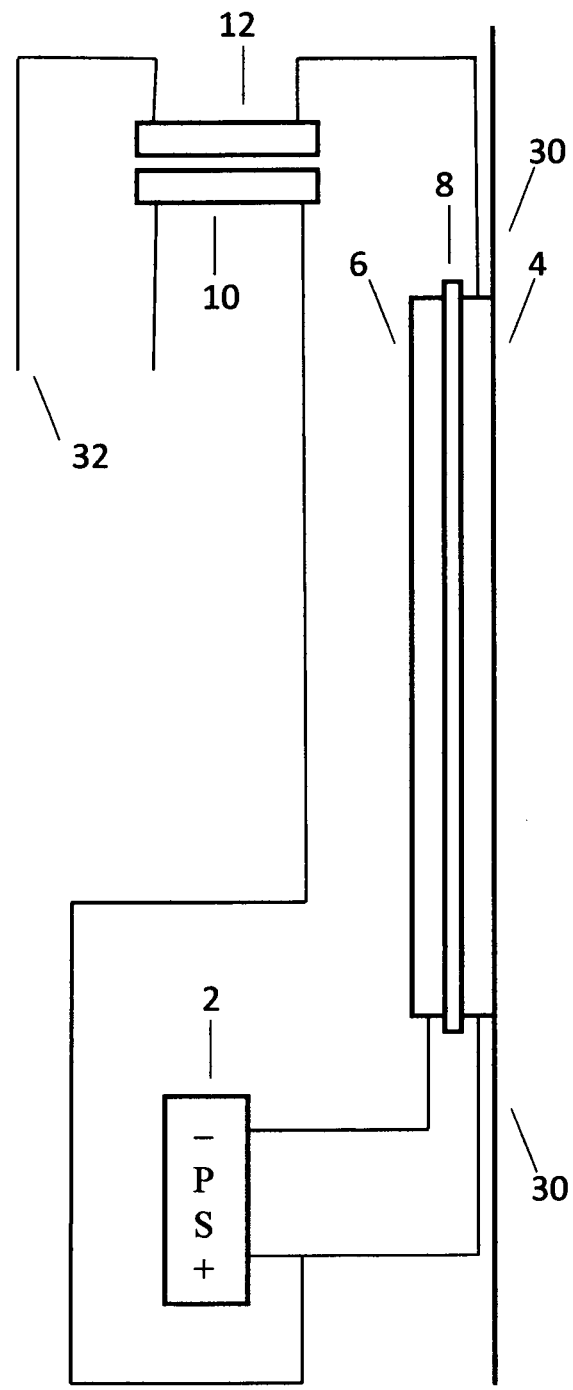

The figures described above are for purposes of explanation of the process and are not drawn to any relative or absolute scale. Furthermore, the actual size, shape, design, value and quantity of parts and components are not absolute but rather are subject to the requirements of the utilization or implementation.

DRAWINGS

Reference Numerals

2. Power source
4. Positive field plate/Interception terminal
6. Negative field plate
8. Dielectric/gap
9. Negative induction plate
10. Positive induction plate
12. Electron isolation plate
14. Positive induction plate
16. Electron isolation plate
18. Electron receiver plate/Interception terminal
20. Valve assembly, represented by a Diode
22. Valve assembly, represented by a Diode
24. Valve assembly, represented by a Diode
26. Valve assembly, represented by a diode
28. Valve assembly, represented by a Diode
30. Exterior wall
32. Negative terminal
34. Positive ground

DETAILED DESCRIPTION

FIGS. 1A, 2A, 3A, 4A, 5A, 6A, 7A and 8A—Variations of Embodiments

Description—FIG. 1A

FIG. 1A shows one variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively.

As shown, the positive field plate 4 is connected to the power source 2 and to the negative field plate 6. The basic circuitry is shown with this figure. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. The interactions establish positive holes throughout the latter side of plate 12. These events contribute to the attraction, capture and isolation of solar electrons. Although a single isolation assembly is shown consisting of parts 10 and 12, it is representative of a group consisting of any quantity that may be required by an implementation. The electrons attracted to and consolidated on the backside of the isolation plate 12 can now be distributed to many devices directly or put to use as may be necessary throughout the spacecraft. This figure also demonstrates a negative terminal 32, which connects to the crafts' electrical system. Subject to the implementation, a terminal is added at a convenient location to complete the circuit. These configurations could be arranged differently or reversed in some embodiments. In this embodiment the positive field plate 4 functions as the primary electron interception terminal located at a convenient position on or within the craft so as to be exposed to solar electrons of the medium. This figure differs from the subsequent in that it does not show any valves, thus representing the embodiment in a simpler form.

Operation—FIG. 1A

The basic operation of FIG. 1A is as previously and herein described. From the perspective shown, electrons are removed from field plate 4 through the power source 2 and transferred to field plate 6. This action leaves positive holes throughout field plate 4, which functions as the electron interception terminal by which electrons from the medium source are attracted and seized. Through the function of induction plate 10, a positive charge is induced on isolation plate 12. The electrons of the medium are simultaneously attracted by the positive holes that permeate field plate 4 and the isolation plate 12. These interactions establish a continuous flow of electrons from the medium to the craft's electrical system. Considering that the isolation plate represents any number that may be required, a substantial quantity of energy can amass over very short periods of time. The energy is thus immediately and directly available for use in a variety of applications. As can be seen, by maintaining the respective electric charge upon the negative field plate 6 and the positive induction plate 10 and exposing the interception terminal, plate 4 of the embodiment to the medium, a continuous supply of electric energy is produced and made ready for use in all onboard systems. Additionally, the process functions as described in the following figures. This figure differs from the subsequent in that it does not show any valves, thus representing the embodiment in a simpler form. A more in depth explanation of the operation of the system is presented with FIG. 2A.

Figure 2A:
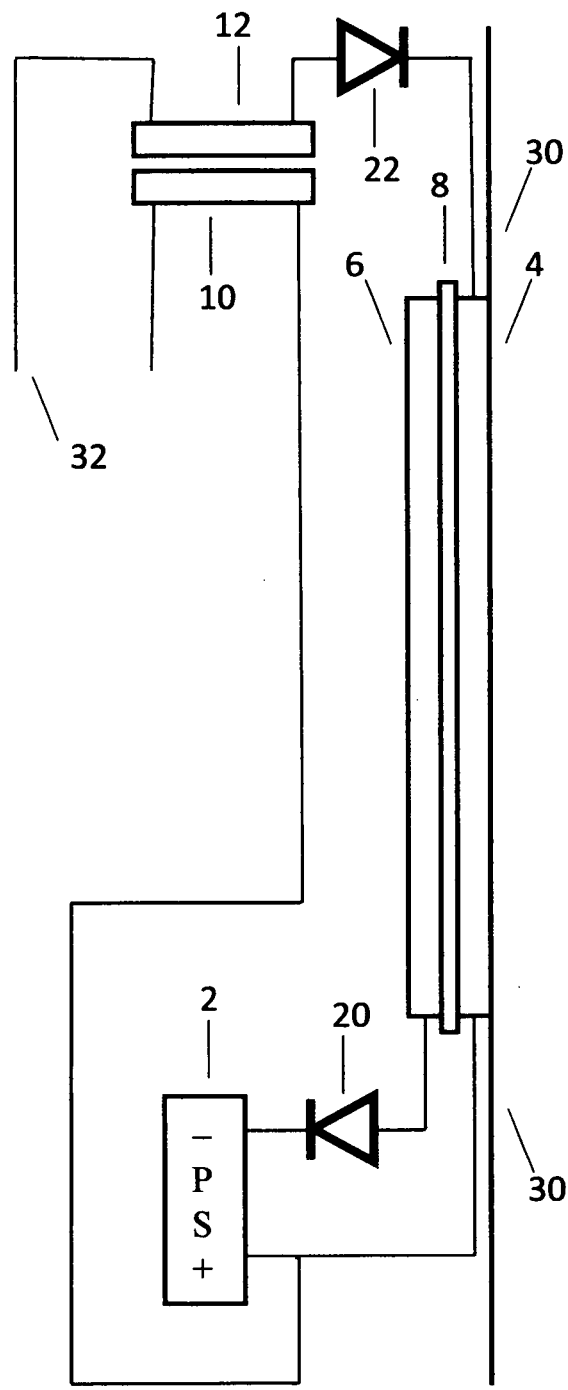

Description—FIG. 2A

FIG. 2A shows another variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively.

As shown, the positive field plate 4 is connected to the power source 2 and through valve 20 to the negative field plate 6. The valve isolates the transferred electrons on the negative field plate 6 and prevents the return of electrons to the positive field plate and other components. All valves shown are represented by diodes although many types of valves can be used. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. The interactions establish positive holes throughout the latter side of plate 12. These events contribute to the attraction, capture and isolation of solar electrons. Although a single isolation assembly is shown consisting of parts 10 and 12, it is representative of a group consisting of any quantity that may be required by an implementation. The electrons attracted to and consolidated on the backside of the isolation plate 12 can now be distributed as electricity to many devices directly or put to use as may be necessary within spacecraft. This figure also demonstrates a negative terminal 32, which connects to the crafts' electrical system. Subject to the implementation, a terminal is added at a convenient location to complete the circuit. These configurations could be arranged differently or reversed in some embodiments. In this embodiment the positive field plate 4 functions as the primary electron interception terminal located at a convenient position on or within the craft so as to attract and seize electrons of the medium.

Operation—FIG. 2A

During the charging phase of a charge segregation and storage assembly connected to a power source, electrons will move from the positive field plate 4 and accumulate upon the negative field plate 6. These electrons that are easily moved about are the valance or outer most electrons in the atoms comprising the positive field plate material. Likewise, here in FIG. 2A, the process involves an electric potential difference to be applied upon the conductive field plates, parts 4 and 6. The atoms of the positive field plate 4 experience a loss of electrons leaving positively charged holes behind that produce a positive electric field, with all holes having a predisposition for replacement electrons. Simultaneously those electrons accumulated upon the negative field plate 6 produce a negative electric field that maintains a constant influence upon the electrons remaining on the positive field plate 4. This influence extends not just to the remaining valance electrons present in the material, but also to the subsequent target electrons. Nevertheless, these interactions create positive holes throughout the field plate 4 to which electrons from external sources are attracted. However, positively charged holes of the field plate 4 do more than just attract targeted electrons, they also contribute to the seizure and confinement of the electrons. During the initial system charging phase, as the valance electrons are being evacuated from the field plate 4, they are also being evacuated from the positive induction plate 10. The positive charges on the surface of the induction plate 10 attract electrons of the atoms of the facing isolation plate 12 to its surface placing a negative charge there, thereby inducing a positive charge on the backside of the isolation plate 12 leaving a positive hole for every displaced electron.

Initially, the valance electrons of the field plate 4 move through the power source 2, continue through valve 20 and to the negative field plate 6. This persists until the predetermined quantity of electrons has transferred to field plate 6. At the same time, electrons were being removed from the induction plate 10, which were also transferred to the negative field plate 6 or to another component that is not shown. Then the power source 2 responds accordingly by shutting down or entering into a standby state. These events place positive charges throughout components 4 and 10, with the number of positive charges on each component being adjustable over a wide range, as previously demonstrated.

As an example, if a +1 charge per atom is placed upon the induction plate 10, in response, one electron per atom will gather on the surface of the opposing isolation plate 12. This leaves the back side of plate 12 with a substantial deficit of electrons equating to an average of one positive hole per atom. These positive holes assist in the attraction and seizure of solar electrons and conclude with their isolation. In another example, subject to the electron configuration of the conducting material, if a +3 charge per atom is placed on plate 10, then up to three electrons per atom will gather on the surface of plate 12 leaving three positive holes per atom behind.

Since the subject concerns the transfer of electrons from one position to another, a discussion pertaining to valance electrons is provided. Conventional electrons that orbit an atom are held in orbit by electrostatic charges within a system designated as the ionization potential having an associated value called the electron binding energy. The attributed values denote the amount of energy necessary to remove each electron. Atoms of different elements have different values of binding energy for each electron in order of its position surrounding the nucleus. The outermost electron will have the lowest energy requirement while the inner most will have the highest. Typically, metals that are good conductors have the lowest binding energy for the outermost electrons. Those that are easily moved about are the outer shell valance electrons that also take part in chemical bonds. Furthermore, as previously stated, depending on their electron configuration, certain metals carry more than one valance electron.

After the initial system charging phase, some of the remaining valance electrons and the subsequent captured electrons will move from plate 4 through valve 22 and accumulate on the backside of the electron isolation plate 12 or group thereof. Those remaining valance and the captured electrons are attracted to the isolation plate 12 by the strong positive charge induced upon the backside of the plate. At this point, the power source 2 remains off or in standby to replenish the charge on the negative field plate 6 when and if necessary. The circuit activates only if the charge on the field plate 6 should degrade, whereby the electric energy will be supplied from the subsequent captured electrons through the field plate 4 or supplied through other components such as the isolation plate 12 or as described in subsequent sections through dedicated circuitry, subject to the implementation.

After the power source 2 has shut off, the quantity of subsequently repelled valance electrons is regulated by the strength of the electric field placed upon the field plate 6. Due, in part, to the expelling valance electrons nearest the negative field plate 6, subsequent electrons of the atoms of field plate 4 are repelled, while simultaneously being attracted to the isolation plate 12. These events leave a strong positive charge throughout the field plate 4. The valance electrons are prevented from returning to the field plate 4 by the valves 20 and 22. Once the field plates 4 and 6 are charged, energy consumption by the power source 2 reduces substantially to a negligible quantity or to zero. Thereafter, energy will be applied infrequently and only if the charge on the negative field plate 6 should degrade. To prevent discharge and degradation of the negative electric field on plate 6, it is typically isolated from the ambient environment, subject to the specific utilization. The field plate 6 is also isolated from field plate 4 with either a sufficient gap or with a minimal and suitable nonconductive barrier, for example, or both. But nevertheless, to maximize the effect of the negative electric field thereof the two components, 4 and 6, are placed as close as necessary to each other. The positive field plate 4 is now poised to attract and seize from the medium a constant supply of solar electrons. These events cause a continuous flow of electrons from field plate 4 to isolation plate 12 and from it to the electrical system of the craft.

Also shown in FIG. 2A and applicable to subsequent figures is component 30 identified as the exterior wall of the craft, station or vehicle to which the system is attached. In this figure, the positive field plate 4 represents the electron interception terminal shown to be flush with the craft exterior. It should be understood that this is showing only one of many positions to which the interception terminal could be placed on or within the craft. The final position and arrangement of the interception terminal in relation to the exterior wall 30 is determined by the design and configuration of the craft or other utilization.

It should also be understood that subject to the requirements of a specific embodiment or implementation, common electronic components or circuitry that may not be expressly shown in the figures are nevertheless represented by necessity, within the written description, or as part of the block components.

In FIG. 2A, single components are shown in the various positions, however, it should be understood that they represent one or more components or groups of components, or any number that may be required by an implementation. For wherever one component is shown, it represents one or more component units, or groups of units, or any number that may be required by an implementation.

As previously stated, the figures show the components and their relative position within an electronic circuit, however, the actual style, shape, size, value, configuration, design, specification and quantity of each part is determined by its final execution and relation to adjoining parts and components of the utilization.

It should be noted that although in the various embodiments two, three, four or five valves are shown, they are representative of a group consisting of any quantity that may be required at any specific position or throughout the circuitry of an implementation. In some instances, transistors can be used throughout the circuitry of an implementation.

As can be seen, by maintaining the respective electric charge upon the negative field plate 6, and the positive induction plate 10 and placing a positively charged component of the embodiment exposed to the medium of the heliosphere, a continuous supply of electric energy is produced and made ready for use in a variety of systems throughout the craft.

In each of the following FIGS. 3A through 8A, the sequence of operation described above is similar, although additional components are shown. It should be also noted that some components shown in individual figures may not be specifically shown in other figures. This was done either to simplify the explanation of operation of an embodiment, to highlight other features of different embodiments shown in the figures or to demonstrate the functionality of an embodiment with the component in place or when the component was excluded.

Figure 3A:
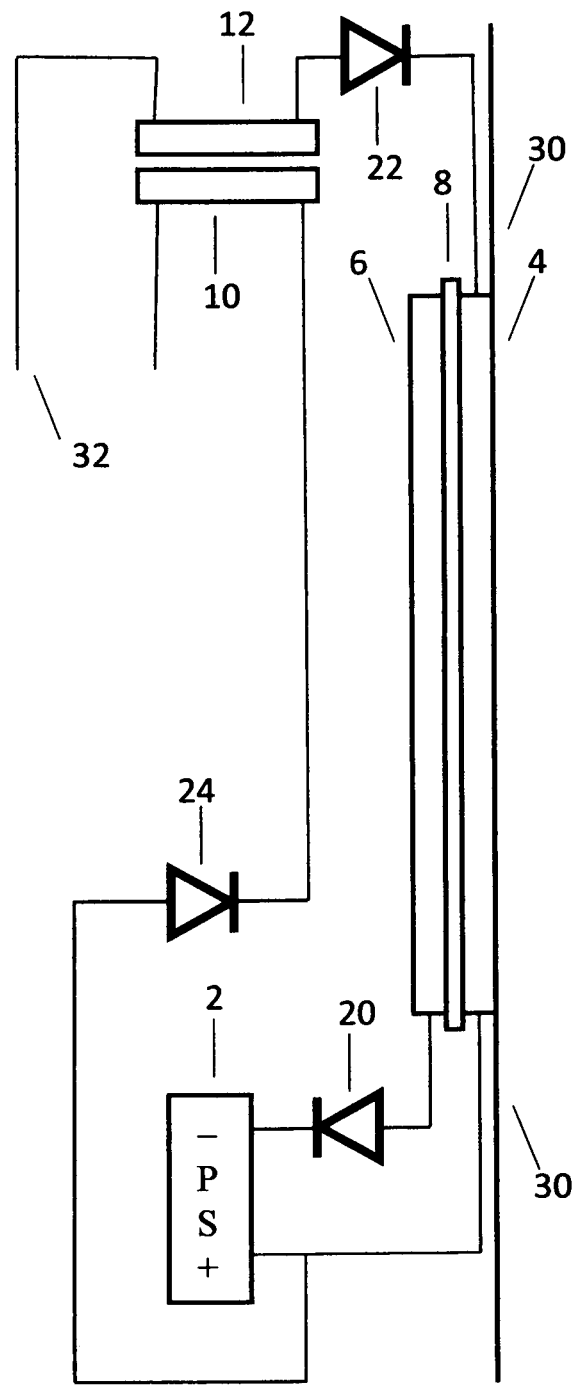

Description—FIG. 3A

FIG. 3A shows another variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively. This figure differs from the previous by the addition of valve 24, which isolates the induction plate 10 by preventing the return of electrons.

As shown, the positive field plate 4 is connected to the power source 2 and through valve 20 to the negative field plate 6. The valve isolates the transferred electrons on the negative field plate 6 and prevents the return of electrons to the positive field plate 4 and other components. All valves shown are represented by diodes although many types of valves can be used. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. The interactions establish positive holes throughout the latter side of plate 12. These events contribute to the attraction, capture and isolation of solar electrons. Although a single electron isolation assembly is shown consisting of parts 10 and 12, it is representative of a group consisting of any quantity that may be required by an implementation. The solar electrons attracted to and consolidated on the backside of the isolation plate 12 can now be distributed as electricity to many devices directly or put to use as may be necessary within the spacecraft. This figure also demonstrates a negative terminal 32 which connects to the electrical system of the craft; these configurations could be arranged differently or reversed in some embodiments. In this embodiment the positive field plate 4 functions as the primary electron interception terminal located at a convenient position on or within the craft so as to be exposed to the free electrons of the medium. This figure differs from the previous by the addition of valve 24, which isolates the induction plate 10.

Operation—FIG. 3A

The basic operation of FIG. 3A is similar as that of the previous figure. From the perspective shown, electrons are removed from field plate 4 through the power source 2 and transferred to field plate 6. This action leaves positive holes throughout field plate 4, which functions as the electron interception terminal by which solar electrons from the medium source are attracted and seized. Through the function of induction plate 10, a positive charge is induced on isolation plate 12. The electrons of the medium are simultaneously attracted by the positive holes that permeate the isolation plate 12 causing them to move through valve 22, where they are prevented from returning to field plate 4 or the medium. These interactions establish a continuous flow of electrons from the medium to the craft's electrical system. Considering that the electron isolation assembly represents any number that may be required, a substantial quantity of energy can amass over very short periods of time. The energy is thus immediately and directly available for use in a variety of applications. As can be seen, by maintaining the respective electric charge upon the negative field plate 6 and the positive induction plate 10 and exposing the interception terminal 4 of the embodiment to the medium, a continuous supply of electric energy is produced and made ready for use by all onboard systems. Additionally, the process functions as described above in FIGS. 1A and 2A.

Figure 4A:
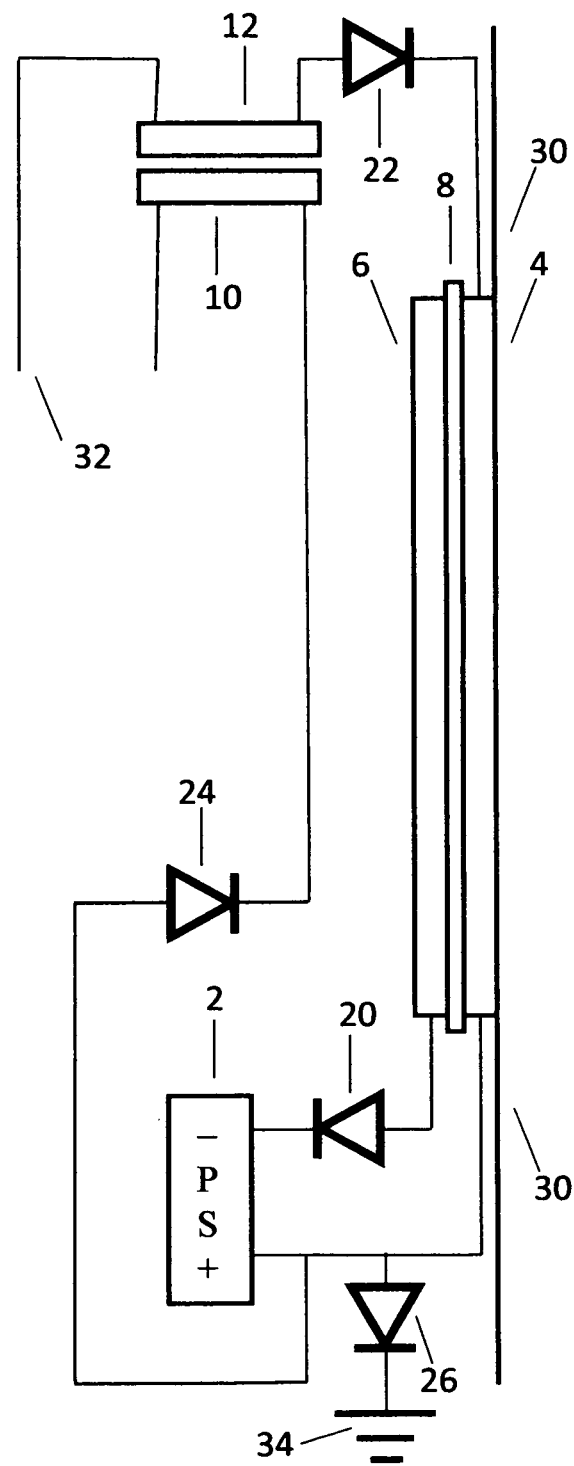
FIG. 4A shows another variation of an embodiment to which a fourth valve 26 is added that prevents the escape of electrons through the ground terminal.

Description—FIG. 4A

FIG. 4A shows another variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively. This figure differs from the previous by the addition of the positive ground terminal 34 and valve 26.

As shown, the positive field plate 4 is connected to the power source 2 and through valve 20 to the negative field plate 6. The valve isolates the transferred electrons on the negative field plate 6 and prevents the return of electrons to the positive field plate 4 and other components. All valves shown are represented by diodes although many types of valves can be used. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. The interactions establish positive holes throughout the latter side of plate 12. These events contribute to the attraction, capture and isolation of solar electrons. Although a single electron isolation assembly is shown consisting of parts 10 and 12, it is representative of a group consisting of any quantity that may be required by an implementation. The solar electrons attracted to and consolidated on the backside of the isolation plate 12 can now be distributed as electricity to many devices directly or put to use as may be necessary throughout the spacecraft. This figure also demonstrates a negative terminal 32 which connects to the electrical system of the craft; these configurations could be arranged differently or reversed in some embodiments. In this embodiment the positive field plate 4 functions as the primary electron interception terminal located at a convenient position on or within the craft so as to be exposed to the free electrons of the medium. This figure differs from the previous by the addition of a ground terminal 34 and valve 26, which prevents the return of electrons to ground.

Operation—FIG. 4A

The basic operation of FIG. 4A is similar as that of the previous figure. From the perspective shown, electrons are removed from field plate 4 through the power source 2 and transferred to field plate 6. This action leaves positive holes throughout field plate 4, which functions as the electron interception terminal by which solar electrons from the medium source are attracted and seized. Through the function of induction plate 10, a positive charge is induced on isolation plate 12. The electrons of the medium are simultaneously attracted by the positive holes that permeate the isolation plate 12 causing them to move through valve 22, where they are prevented from returning to field plate 4 or the medium. These interactions establish a continuous flow of electrons from the medium to the craft's electrical system. Considering that the electron isolation assembly represents any number that may be required, a substantial quantity of energy can amass over very short periods of time. The energy is thus immediately and directly available for use in a variety of applications. As can be seen, by maintaining the respective electric charge upon the negative field plate 6 and the positive induction plate 10 and exposing the interception terminal 4 of the embodiment to the medium, a continuous supply of electric energy is produced and made ready for use by all onboard systems. This figure differs from the previous by the addition of a ground terminal 34 and valve 26, which prevents the return of electrons to ground. Additionally, the process functions as described above in FIGS. 1A, 2A and 3A.

Figure 5A:
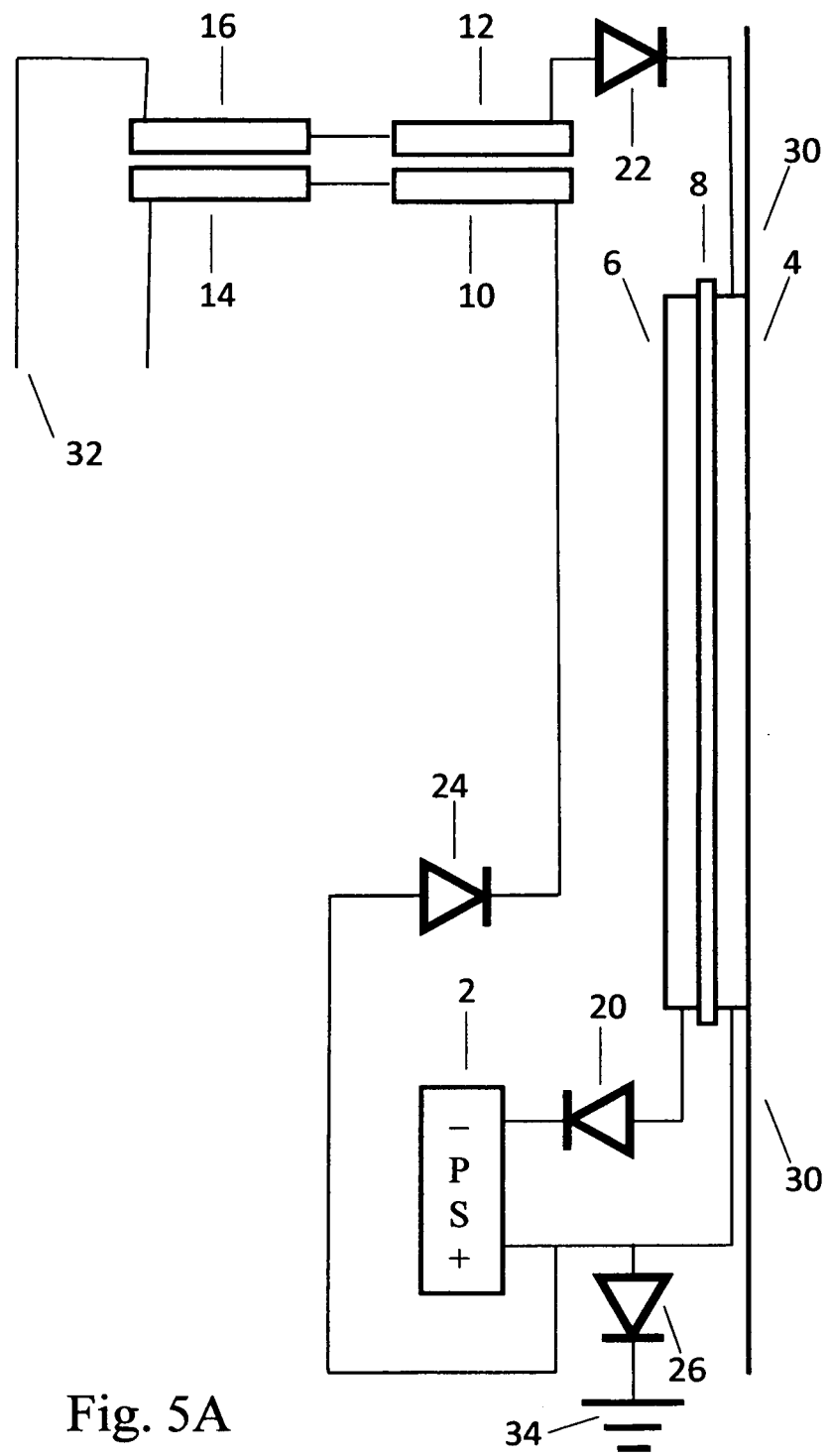
FIG. 5A shows another variation of an embodiment containing four valves and a second electron isolation assembly.

Description—FIG. 5A

FIG. 5A shows another variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively. This figure differs from the previous by the addition of a second electron isolation assemble consisting of parts 14 and 16.

As shown, the positive field plate 4 is connected to the power source 2 and through valve 20 to the negative field plate 6. The valve isolates the transferred electrons on the negative field plate 6 and prevents the return of electrons to the positive field plate 4 and other components. All valves shown are represented by diodes although many types of valves can be used. The positive induction plates 10 and 14 also connect to the power source 2. Just as with the positive field plate 4, when the power source is activated, electrons are removed from the positive induction plates 10 and 14, and then transferred to the negative field plate 6. The positive charge established there on plates 10 and 14 initiates a series of events that take place within the opposite electron isolation plates 12 and 16. The interactions establish positive holes throughout the latter side of plates 12 and 16. These events contribute to the attraction, capture and isolation of solar electrons. Two electron isolation assemblies are shown with one consisting of parts 10 and 12, and the other of parts 14 and 16. These are representative of a group consisting of any quantity that may be required by an implementation. The solar electrons attracted to and consolidated on the backside of the isolation plates 12 and 16 can now be distributed as electricity to many devices directly or put to use as may be necessary throughout the spacecraft. This figure also demonstrates a negative terminal 32 which connects to the electrical system of the craft; these configurations could be arranged differently or reversed in some embodiments. In this embodiment the positive field plate 4 functions as the primary electron interception terminal located at a convenient position on or within the craft so as to be exposed to the free electrons of the medium. This figure differs from the previous by the addition of a second electron isolation assemble consisting of the electron induction plate part 14 and the electron isolation plate part 16. The second electron insolation assembly consisting of parts 14 and 16 is shown connected in series; however it can also be connected in a parallel arrangement, subject to the implementation.

Operation—FIG. 5A

The basic operation of FIG. 5A is similar as that of the previous figure. From the perspective shown, electrons are removed from field plate 4 through the power source 2 and transferred to field plate 6. This action leaves positive holes throughout field plate 4, which functions as the electron interception terminal by which solar electrons from the medium source are attracted and seized. Through the function of induction plates 10 and 14, a positive charge is induced on isolation plates 12 and 16. The free electrons of the medium are simultaneously attracted by the positive holes that permeate the isolation plates 12 and 16 causing them to move through valve 22, where they are prevented from returning to field plate 4 or the medium. These interactions establish a continuous flow of electrons from the medium to the craft's electrical system. Considering that the electron isolation assembly represents any number that may be required, a substantial quantity of energy can amass over very short periods of time. The energy is thus immediately and directly available for use in a variety of applications. As can be seen, by maintaining the respective electric charge upon the negative field plate 6 and the positive induction plates 10 and 14, and exposing the interception terminal 4 of the embodiment to the medium, a continuous supply of electric energy is produced and made ready for use by all onboard systems. This figure differs from the previous by the addition of a second electron isolation assemble consisting of the electron induction plate 14 and the electron isolation plate 16. Supplementary electron isolation assemblies as shown here substantially increase the electrical capacity of the system. Additionally, the process functions as described above in FIGS. 1A, 2A, 3A and 4A.

Figure 6A:
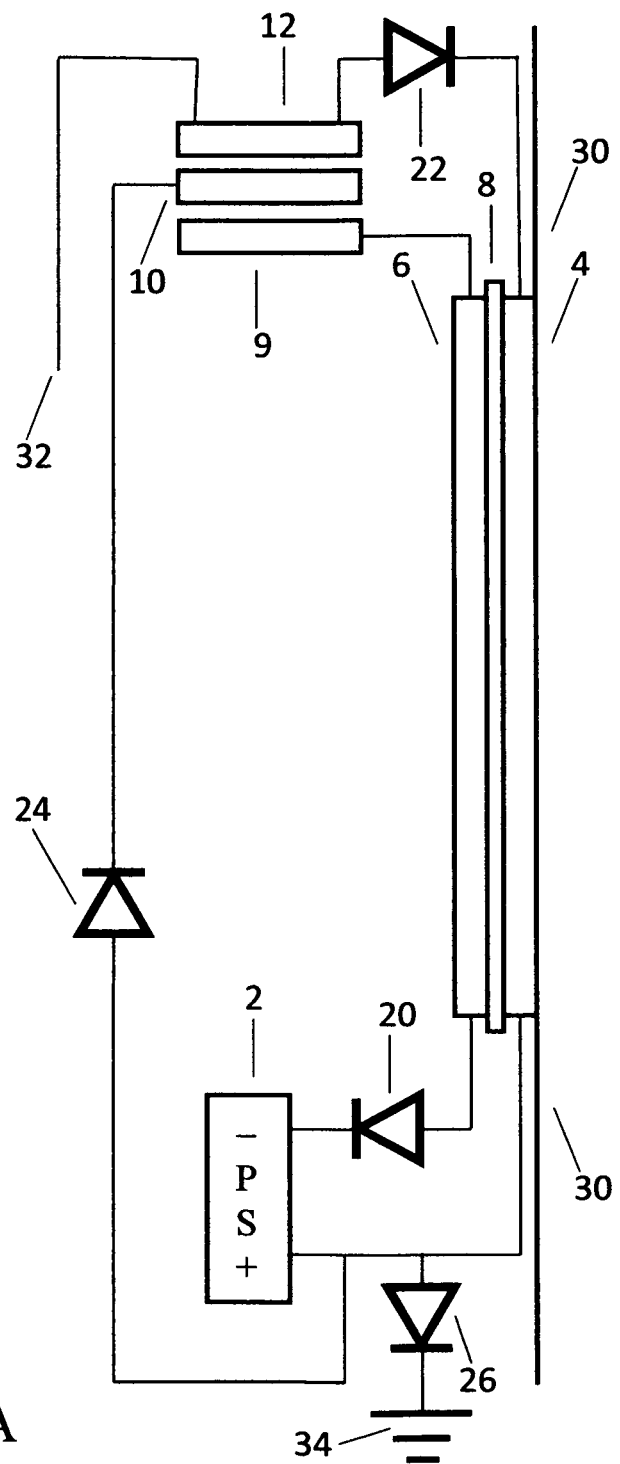
FIG. 6A shows another variation of an embodiment containing four valves and a modified electron isolation assembly demonstrating one method to charge the positive induction plate 10.

Description—FIG. 6A

FIG. 6A shows another variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively. This figure differs from the previous by the addition of the negative induction plate 9.

As shown, the positive field plate 4 is connected to the power source 2 and through valve 20 to the negative field plate 6. The valve isolates the transferred electrons on the negative field plate 6 and prevents the return of electrons to the positive field plate 4 and other components. All valves shown are represented by diodes although many types of valves can be used. The positive induction plate 10 also connects to the power source 2. Just as with the positive field plate 4, when the power source is activated, electrons are removed from the positive induction plate 10 and transferred to the negative field plate 6 and the negative induction plate 9. The positive charge established there on plate 10 initiates a series of events that take place within the opposite electron isolation plate 12. The interactions establish positive holes throughout the latter side of plate 12. These events contribute to the attraction, capture and isolation of solar electrons. Although a single modified electron isolation assembly is shown consisting of parts 9, 10 and 12, it is representative of a group consisting of any quantity that may be required by an implementation. The solar electrons attracted to and consolidated on the backside of the isolation plate 12 can now be distributed as electricity to many devices directly or put to use as may be necessary throughout the spacecraft. This figure also demonstrates a negative terminal 32 which connects to the electrical system of the craft; these configurations could be arranged differently or reversed in some embodiments. In this embodiment the positive field plate 4 functions as the primary electron interception terminal located at a convenient position on or within the craft so as to be exposed to the free electrons of the medium. This figure differs from the previous by the addition of the negative induction plate 9, shown connected to the negative field plate 6. The addition of induction plate 9 demonstrates another method to place a positive charge on the positive induction plate 10.

Operation—FIG. 6A

The basic operation of FIG. 6A is similar as that of the previous figure. From the perspective shown, electrons are removed from field plate 4 through the power source 2 and transferred to field plate 6. This action leaves positive holes throughout field plate 4, which functions as the electron interception terminal by which solar electrons from the medium source are attracted and seized. In this embodiment, a modified electron isolation assembly consisting of the negative induction plate 9, the positive induction plate 10 and the electron isolation plate 12 is introduced. The assemblage of the three parts modifies the electron isolation assembly into a highly adjustable component having a broad range. As can be seen, during the initial system charging phase, the plates 9 and 10 are charged by removing electrons from plate 10 and transferring them to plate 9. Through the interaction of the negative induction plate 9 with the positive induction plate 10, a positive charge is induced on isolation plate 12. The free electrons of the medium are simultaneously attracted by the positive holes that permeate the isolation plate 12 causing the particles to move through valve 22, where they are prevented from returning to field plate 4 or the medium. These interactions establish a continuous flow of electrons from the medium to the craft's electrical system. It should be noted that plate 9 could bypass connection to the field plate 6 and connect directly to the power source 2 or another power source. Considering that the modified electron isolation assembly represents any number that may be required, a substantial quantity of energy can amass over very short periods of time. The energy is thus immediately and directly available for use in a variety of applications. As can be seen, by maintaining the respective electric charge upon the negative field plate 6 and the positive induction plate 10 and exposing the interception terminal 4 of the embodiment to the medium, a continuous supply of electric energy is produced and made ready for use by all onboard systems. This figure differs from the previous with a modified electron isolation assembly by the addition of the negative induction plate 9, which is shown connected to the negative field plate 6. Additionally, the process functions as described above in FIGS. 1A, 2A, 3A, 4A and 5A.

Figure 7A:
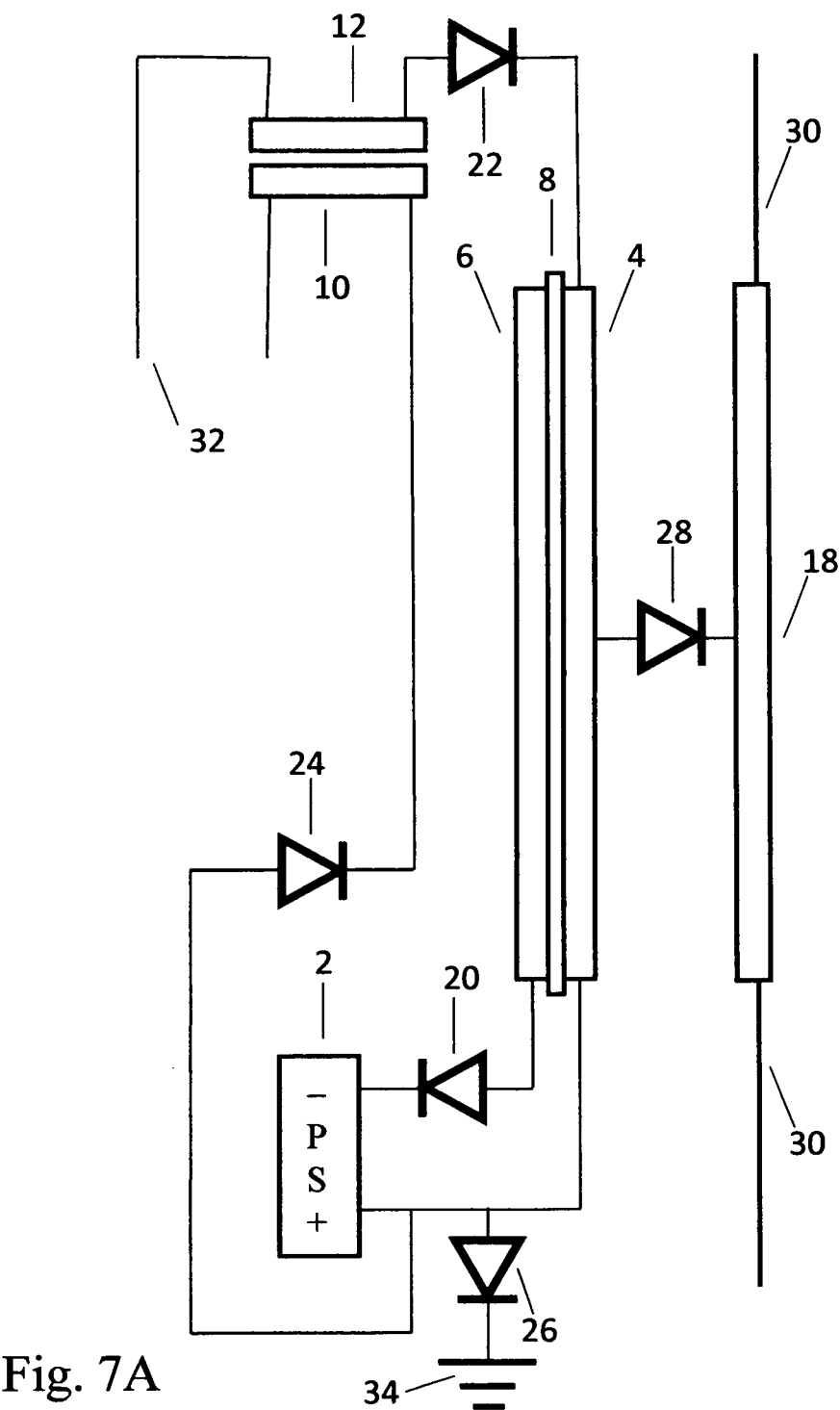
FIG. 7A shows another variation of an embodiment containing an alternate electron interception terminal consisting of an attached receiver plate 18 with an adjoining fifth valve 28.

Description—FIG. 7A

FIG. 7A shows another variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively. This figure differs from the previous by the exclusion of the negative induction plate 9 and the addition of an electron receiver plate, part 18, which functions as the electron interception terminal. The receiver plate 18 is exposed to the medium rather than the positive field plate 4. It connects to field plate 4 through valve 28.

As shown, the positive field plate 4 is connected to the power source 2 and through valve 20 to the negative field plate 6. The valve 20 isolates the transferred electrons on the negative field plate 6 and prevents the return of electrons to the positive field plate 4 and other components. All valves shown are represented by diodes although many types of valves can be used. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. This relationship establishes positive holes throughout the latter side of plate 12. Although a single electron isolation assembly is shown consisting of parts 10 and 12, it is representative of a group consisting of any quantity that may be required by an implementation. The electrons attracted to and consolidated on the backside of the isolation plate 12 can now be distributed to many devices directly or put to use as may be necessary throughout the spacecraft. This figure also demonstrates a negative terminal 32, which connects to the craft's electrical system. The positive ground 34 is also shown here connected through valve 26. In this embodiment the positive field plate 4 no longer functions as the primary electron interception terminal. This function has been transferred to the electron receiver plate 18 as the primary interception terminal. Through valve 28, the field plate 4 and receiver plate 18 are connected. The receiver plate 18 is located at a convenient position on or within the craft so as to attract and seize free electrons of the medium. This figure differs from the previous by the addition of the receiver plate 18 and valve 28, which prevents the return of electrons to plate 18 and the medium.

Operation—FIG. 7A

The basic operation of FIG. 7A is similar as that of the previous figures. From the perspective shown, electrons are removed from field plate 4 through the power source 2 and transferred to field plate 6. However, in this embodiment field plate 4 no longer functions as the electron interception terminal. This responsibility has been transferred to the electron receiver plate 18 by which free electrons from the medium source will be attracted and seized. With the receiver plate 18 connected through valve 28 to the positive field plate 4, resident valance electrons are removed from plate 18, transferred to field plate 4 and then to field plate 6. The transfer of responsibility began with the initial system charging phase whereupon completion the power source shut down. These actions leave positive holes throughout field plate 4 and receiver plate 18. Thus leaving plate 18 now poised to attract and seize electrons from the medium. Valve 28 prevents the return of electrons to plate 18. In turn the attracted and seized electrons of the medium are then transferred to the isolation plate 12. Through the function of induction plate 10, a positive charge is induced on isolation plate 12. The seized electrons of the medium are simultaneously attracted by the positive holes that permeate the isolation plate 12 causing the particles to move through valve 22, where they are prevented from returning to field plate 4. These interactions establish a continuous flow of electrons from the medium to the craft's electrical system. Considering that the isolation plate represents any number that may be required, a substantial quantity of energy can amass over very short periods of time. The energy is thus immediately available for use in a variety of applications. As can be seen, by maintaining the respective electric charge upon the negative field plate 6 and the positive induction plate 10 and exposing the electron receiver plate 18 to the medium, a continuous supply of electric energy is produced and made ready for use in all onboard systems. Additionally, the process functions as described above in FIGS. 1A, 2A, 3A, 4A, 5A and 6A.

Figure 8A:
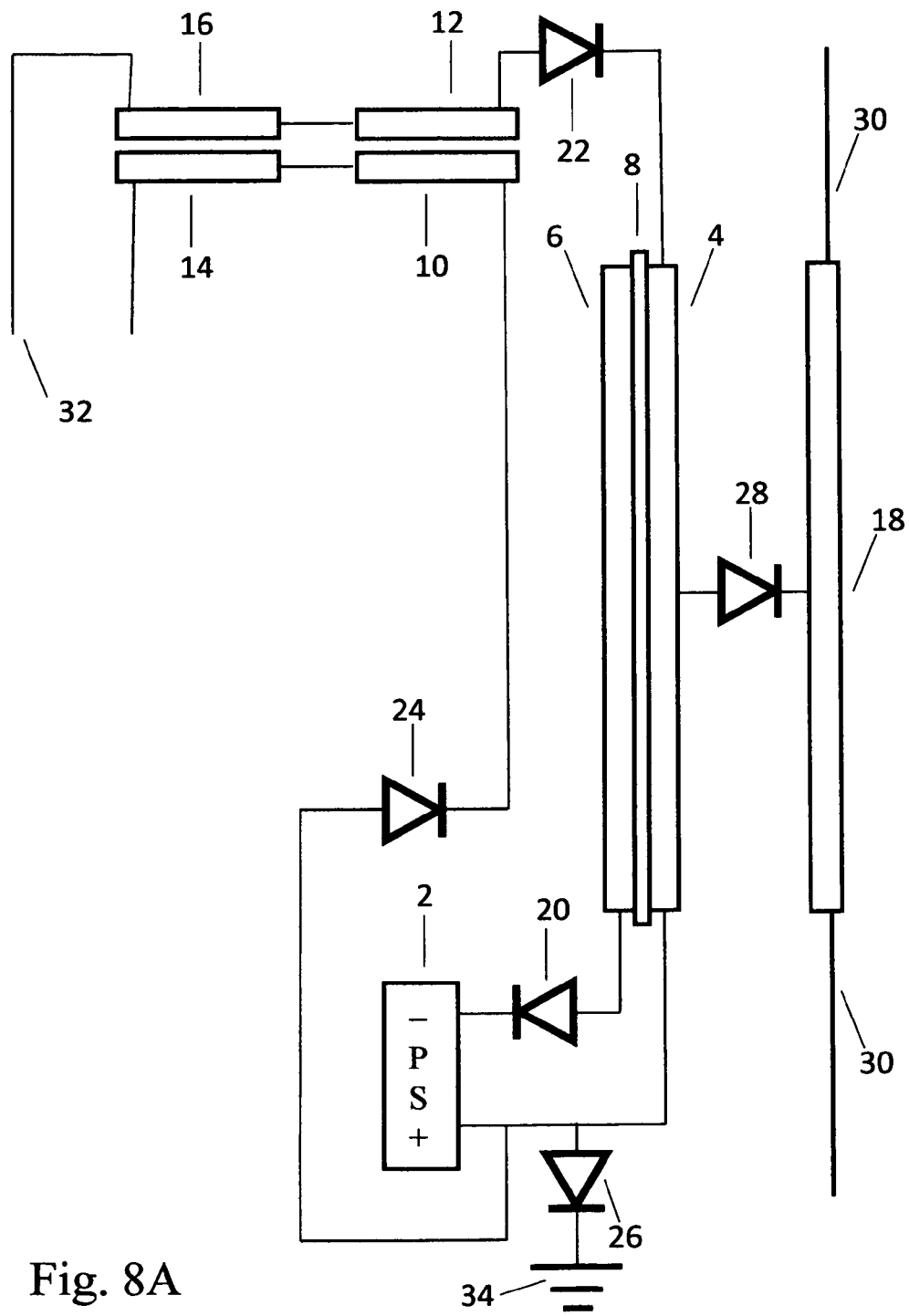
FIG. 8A shows another variation of an embodiment containing a second electron isolation assembly and an alternate electron interception terminal consisting of an attached receiver plate 18 with an adjoining fifth valve 28.

Description—FIG. 8A

FIG. 8A shows another variation of the basic components of an embodiment coupled with a schematic diagram indicating their relative position within an electronic circuit. The components include a power source, part 2, with the negative terminal connected to the negative field plate, part 6, while the positive terminal is connected to the positive field plate, part 4. The parts 6 and 4 are in fact the negative and positive plates of a charge segregation and storage assembly, respectively. This figure differs from the previous by the addition of an electron receiver plate, part 18, which functions as the electron interception terminal. The receiver plate is exposed to the medium rather than the positive field plate 4. It connects to field plate 4 through valve 28. This figure also differs from the previous by the addition of a second electron isolation assembly, consisting of parts 14 and 16, which increases the collection and isolation capacity for electrons of the medium.

As shown, the positive field plate 4 is connected to the power source 2 and through valve 20 to the negative field plate 6. The valve 20 isolates the transferred electrons on the negative field plate 6 and prevents the return of electrons to the positive field plate 4 and other components. All valves shown are represented by diodes although many types of valves can be used. The positive induction plates 10 and 14 also connect to the power source 2. Just as with the positive field plate 4, when the power source is activated, electrons are removed from the positive induction plates 10 and 14 and transferred to the negative field plate 6. The positive charge established there on plates 10 and 14 initiate a series of events that take place within the opposite electron isolation plates 12 and 16. This relationship establishes positive holes throughout the latter side of plates 12 and 16. In this figure two sequestration assembly units are shown consisting of parts 10 and 12 as one and 14 and 16 representing the second. These are representative of a group consisting of any quantity that may be required by an implementation. The electrons attracted to and consolidated on the backside of the isolation plates 12 and 16 can now be distributed to many devices directly or put to use as may be necessary within the spacecraft. This figure also demonstrates a negative terminal 32, which connects to the craft's electrical system. The positive ground 34 is shown here connected through valve 26. In this embodiment the positive field plate 4 no longer functions as the primary electron interception terminal. This function has been transferred to the electron receiver plate 18 as the primary interception terminal. Through valve 28, the field plate 4 and receiver plate 18 are connected. The receiver plate 18 is located at a convenient position on or within the craft so as to attract and seize free electrons of the medium. This figure differs from the previous by the addition of the receiver plate 18 and valve 28, which prevents the return of electrons to plate 18 and the medium. This figure also differs from the previous by the addition of a second electron isolation assembly, consisting of parts 14 and 16, which increases the collection and isolation capacity for electrons of the medium.

Operation—FIG. 8A

The basic operation of FIG. 8A is similar as that of the previous figures. From the perspective shown, electrons are removed from field plate 4 through the power source 2 and transferred to field plate 6. However, in this embodiment field plate 4 no longer functions as the electron interception terminal. This responsibility has been transferred to the electron receiver plate 18 by which electrons from the medium source will be attracted and seized. With the receiver plate 18 connected through valve 28 to the positive field plate 4, resident valance electrons are removed from plate 18, transferred to field plate 4 and then to field plate 6. The transfer of the resident valance electrons began with the initial system charging phase whereupon completion the power source shut down. These actions leave positive holes throughout field plate 4 and receiver plate 18. Thus leaving plate 18 now poised to attract and seize electrons from the medium. Valve 28 prevents the return of electrons to plate 18. Through the function of induction plates 10 and 14, a positive charge is induced on isolation plates 12 and 16. The seized electrons of the medium are simultaneously attracted by the positive holes that permeate the isolation plates 12 and 16 causing seized electrons to move from plate 18 to plate 4 and through valve 22, where they are prevented from returning to field plate 4. These interactions establish a continuous flow of electrons from the medium to the craft's electrical system. Considering that the isolation plates represent any number that may be required, a substantial quantity of energy can amass over very short periods of time. The energy is thus immediately available for use in a variety of applications. As can be seen, by maintaining the respective electric charge upon the negative field plate. 6 and the positive induction plates 10 and 14, and exposing the electron receiver plate 18 to the medium, a continuous supply of electric energy is produced and made ready for use in all onboard systems. Additionally, the process functions as described above in FIGS. 1A, 2A, 3A, 4A, 5A, 6A and 7A.

Alternative Embodiments

Although the descriptions above show many alternative embodiments, they should not be interpreted as to limit the scope of the embodiments, as they are representations of only a small number of potential embodiments. Furthermore, the principal components of any embodiment may be arranged differently and the components may take on different values, shapes, configurations, specifications and quantities from that shown or described herein.

Advantages:

By utilizing the process of the present application, it is no longer necessary for spacecraft to carry large quantities of chemicals for batteries, fuels and oxidizers for fuel cell generators, hazardous nuclear generators or large bulky photovoltaic panels with complicated unfolding mechanisms that are subject to frequent malfunction. The features of the subject process make each spacecraft independent from the domestic fuel sources typically required for the production of electricity by other systems. In terms of energy production, the subject process will outperform all of the traditional systems previously described including photovoltaic systems, fuel cells and nuclear generators. It is an innovative process for the production of electric energy by the attraction and seizure of beta-minus particles and electrons emitted from the Sun's corona. The system will also attract and seize beta-minus particles and electrons emitted by sources outside the heliosphere that are contained within the interstellar medium. Because it captures electrons directly from solar wind emissions, it does not consume power to convert one form of energy into another. It functions continuously throughout and beyond the heliosphere. It can be scaled to accommodate the electric power requirements of all spacecraft, including satellites and space stations. The process will accommodate the electric needs of base stations and surface vehicles situated on various moons and asteroids throughout the solar system including the planets Mercury and Mars. Furthermore, it is suitable as a charging system for all batteries that may be used in space. It is adaptable to many other implementations and utilizations. Some of the terms that describe the advantages of the process of the present application are simplicity, efficiency, adaptability, versatility, low energy consumption, and high productivity.

CONCLUSION, RAMIFICATIONS AND SCOPE

Accordingly, the reader will see that the process of the present application is superior to all prior art for the seizure of beta-minus particles and electrons from solar wind, cosmic radiation and other emission sources for the production of electricity for spacecraft and other space facilities.

As has been demonstrated here, the beta-minus particles and electrons that permeate the space above the planet's atmosphere are not particles bound to any atom or molecule, hence, electron binding energy is not a factor in their apprehension. Since, the electrons are free and independent particles, already moving towards any craft situated out there, no energy is expended in their attraction and seizure. Furthermore, to maintain a constant supply of electricity for the craft's electrical system, the subject process provides a series of components that are advantageously organized for the seizure and isolation of beta-minus particles and electrons present in various outer space environments.

What is claimed is:

1. A system for the collection of electric energy for spacecraft, facilities and vehicles located beyond the Earth's atmosphere by attracting and collecting free negatively charged electrons and beta-minus particles that are found beyond the Earth's atmosphere, the system comprising:
    a) a positively charged interior structure field plate (4) located beyond the Earth's atmosphere, exposed to and collecting free negatively charged electrons and beta-minus particles, the positively charged interior structure field plate (4) attached to a non-conductive member (8) and the non-conductive member (8) attached to a negatively charged inner surface field plate (6);
    b) the negatively charged inner surface field plate (6) attached to a first one way valve (20), the first one way valve (20) attached to a negative terminal of a power supply (2) the power supply (2) comprising a positive terminal, the positive terminal connected to a second one way valve (24);
    c) the second one way valve (24) connected to a first positive induction plate (10), the first positive induction plate (10) in communication with an isolation plate (12), the isolation plate (12) attached to a negative terminal (32) and the isolation plate (12) attached to a third one way valve (22);
    d) the third one way valve (22) attached to the positively charged interior structure field plate (4), and the positively charged interior structure field plate (4) attached to a fourth one way valve (26) and the fourth one way valve (26) attached to a positive ground terminal (34);
wherein the system is configured to generate usable power; and further wherein the system is configured to operate in space and not in atmosphere.

2. The system of claim 1 further including an interception terminal (18) attached to a fifth one way valve (28) and the fifth one way valve (28) attached to the positively charged interior structure field plate (4) wherein the interception terminal (18) collects negatively charged electrons and beta-minus particles for transmission through the first one way valve (28) for further transmission to:
    a) the positively charged interior structure field plate (4) for further transmission to the third one way valve (22) for further transmission to the isolation plate (12);
    b) the free negatively charged electrons and beta-minus particles isolated on the isolation plate (12) are available as electricity to the positive terminal (32);
    c) one second way valve (24) isolates the positive charge on the first positive induction plate (10); and,
    d) the first one way valve (20) isolates the negative charge on the negatively charged inner surface field plate (6).

3. The system of claim 2 wherein the migration of electrons from the positive induction plate (10) to the negative field plate (6) or any other component, for the purpose of accepting the electrons of the first positive induction plate (10).

4. The system of claim 3 wherein the positive charge on the first positive induction plate (10) attracts electrons from a facing surface of isolation plate (12).

5. The system of 4 wherein the migration of electrons from the facing plate of isolation plate (12) induces a positive electric charge creates positive holes within nuclei of the isolation plate (12).

6. The system of claim 5 wherein a negative induction plate (9) is in communication with the negative charge plate (6) and the negative induction plate (9) in communication with the first positive induction plate (10), the negative induction plate (9) collecting electrons removed from the first positive induction (10).

* * * * *